(12) United States Patent
Colombo et al.

(10) Patent No.: US 12,270,326 B2
(45) Date of Patent: Apr. 8, 2025

(54) FILTER FOR THE AFTERTREATMENT OF EXHAUST GASES OF INTERNAL COMBUSTION ENGINES

(71) Applicant: UMICORE AG & CO. KG, Hanau-Wolfgang (DE)

(72) Inventors: Massimo Colombo, Frankfurt am Main (DE); Jan Schoenhaber, Darmstadt (DE); Meike Antonia Gotthardt, Frankfurt (DE); Carolin Braun, Langen (DE)

(73) Assignee: UMICORE AG & CO. KG, Hanau-Wolfgang (DE)

( * ) Notice: Subject to any disclaimer, the term of this patent is extended or adjusted under 35 U.S.C. 154(b) by 0 days.

(21) Appl. No.: 18/547,856

(22) PCT Filed: Mar. 22, 2022

(86) PCT No.: PCT/EP2022/057425
§ 371 (c)(1),
(2) Date: Aug. 24, 2023

(87) PCT Pub. No.: WO2022/200310
PCT Pub. Date: Sep. 29, 2022

(65) Prior Publication Data
US 2024/0141812 A1    May 2, 2024

(30) Foreign Application Priority Data

Mar. 23, 2021 (EP) .................................... 21164198

(51) Int. Cl.
*F01N 3/035* (2006.01)
*B01J 29/74* (2006.01)
(Continued)

(52) U.S. Cl.
CPC .............. *F01N 3/035* (2013.01); *B01J 35/56* (2024.01); *B01J 37/0232* (2013.01);
(Continued)

(58) Field of Classification Search
CPC ........ F01N 3/035; F01N 3/021; F01N 3/0222; F01N 3/0224; F01N 3/2066;
(Continued)

(56) References Cited

U.S. PATENT DOCUMENTS 6,709,644 B2    3/2004  Zones et al.
8,277,880 B2   10/2012  Sato et al.
(Continued)

FOREIGN PATENT DOCUMENTS

DE    102018108346 A1    10/2019
DE    102018127953 A1     5/2020
(Continued)

OTHER PUBLICATIONS

International Search Report dated Jun. 21, 2022 for International Patent Application No. PCT/EP2022/057425 (4 Pages).
(Continued)

*Primary Examiner* — Audrey B. Walter
(74) *Attorney, Agent, or Firm* — Smith, Gambrell & Russell, LLP

(57) ABSTRACT

The present invention relates to a wall-flow filter for removing particles from the exhaust gas of an internal combustion engine, which comprises a coating F, which comprises a sintered material S, wherein material S comprises an oxide, oxide-hydroxide, carbonate, sulphate, silicate, phosphate, mixed oxide, composite oxide, molecular sieve or a mixture comprising two or more of these materials.

21 Claims, 1 Drawing Sheet

(51) Int. Cl.
  *B01J 35/56* (2024.01)
  *B01J 37/02* (2006.01)
  *F01N 3/02* (2006.01)
  *F01N 3/021* (2006.01)
  *F01N 3/022* (2006.01)
  *F01N 3/20* (2006.01)

(52) U.S. Cl.
  CPC ........... *F01N 3/021* (2013.01); *F01N 3/0222* (2013.01); *F01N 3/0224* (2013.01); *F01N 3/2066* (2013.01); *B01D 2255/1023* (2013.01); *B01D 2255/1025* (2013.01); *B01D 2255/407* (2013.01); *B01D 2255/9155* (2013.01); *B01J 29/743* (2013.01); *F01N 2330/14* (2013.01); *F01N 2510/068* (2013.01)

(58) Field of Classification Search
  CPC ............. F01N 2330/14; F01N 2510/068; B01J 35/56; B01J 37/0232; B01J 29/743; B01D 2255/1023; B01D 2255/1025; B01D 2255/407; B01D 2255/9155
  See application file for complete search history.

(56) References Cited

U.S. PATENT DOCUMENTS

| | | | |
|---|---|---|---|
| 8,388,721 B2 | 3/2013 | Ishizawa | |
| 8,617,474 B2 | 12/2013 | Bull et al. | |
| 11,135,571 B2 | 10/2021 | Quinet et al. | |
| 11,305,269 B2 | 4/2022 | Deibel et al. | |
| 11,441,459 B2 | 9/2022 | Deibel et al. | |
| 11,566,548 B2 | 1/2023 | Foerster et al. | |
| 2007/0217978 A1* | 9/2007 | Baican | F01N 3/0835 502/80 |
| 2008/0107806 A1 | 5/2008 | Mergner et al. | |
| 2013/0149440 A1* | 6/2013 | Pyzik | C04B 41/009 427/140 |
| 2013/0205743 A1 | 8/2013 | Sobolevskiy | |
| 2021/0046467 A1 | 2/2021 | Bellham et al. | |
| 2021/0129066 A1* | 5/2021 | Tremel | F01N 3/101 |
| 2021/0179501 A1* | 6/2021 | Lewis | C04B 41/009 |
| 2021/0236976 A1 | 8/2021 | Foerster et al. | |
| 2021/0396167 A1* | 12/2021 | Foerster | C04B 35/195 |
| 2022/0325645 A1 | 10/2022 | Gensch et al. | |

FOREIGN PATENT DOCUMENTS

| | | |
|---|---|---|
| DE | 102018127955 A1 | 5/2020 |
| EP | 0 345 695 A2 | 12/1989 |
| EP | 0 385 164 A2 | 9/1990 |
| EP | 2 502 661 A2 | 9/2012 |
| EP | 2 727 640 A1 | 5/2014 |
| EP | 2 502 662 B1 | 6/2014 |
| EP | 2 576 021 B1 | 12/2014 |
| EP | 1 789 190 B1 | 6/2017 |
| JP | H01-151706 A | 6/1989 |
| WO | 89/03366 A1 | 4/1989 |
| WO | 2005/016497 A1 | 2/2005 |
| WO | 2007/011101 A1 | 1/2007 |
| WO | 2008/106519 A1 | 9/2008 |
| WO | 2008/118434 A1 | 10/2008 |
| WO | 2008/132452 A2 | 11/2008 |
| WO | 2011/013006 A2 | 2/2011 |
| WO | 2011/127505 A1 | 10/2011 |
| WO | 2011/151711 A1 | 12/2011 |
| WO | 2012/030533 A1 | 3/2012 |
| WO | 2012/030534 A1 | 3/2012 |
| WO | 2017/101449 A1 | 6/2017 |
| WO | 2018/018406 A1 | 2/2018 |
| WO | 2019/096785 A1 | 5/2019 |
| WO | 2019/197177 A1 | 10/2019 |
| WO | 2019/211373 A1 | 11/2019 |
| WO | 2019/215208 A1 | 11/2019 |
| WO | 2020/094763 A1 | 5/2020 |
| WO | WO-2020094760 A1 * | 5/2020 ....... B01D 46/24492 |

OTHER PUBLICATIONS

Written Opinion of the International Searching Authority dated Jun. 21, 2022 for International Patent Application No. PCT/EP2022/057425 (6 pages).

DIN 66132: Bestimmung der spezifischen Oberfläche von Feststoffen durch Stickstoffadsorption; Einpunkt-Differenzverfahren nach Haul und Dümbgen. [Determination of specific surface area of solids by adsorption of nitrogen; single-point differential method according to Haul and Dümbgen.] Standard by Deutsches Institut Fur Normung E.V. [German National Standard], 1975. 5 pages in German with English machine translation.

DIN 66133. Jun. 1993, Bestimmung der Porenvolumenverteilung und der spezifischen Oberfläche von Feststoffen durch Quecksilberintrusionv. [Determination of the pore volume distribution and the specific surface area of solids by mercury intrusion] (3 pages in German with machine translation).

DIN 66134. Feb. 1998, Bestimmung der Porengrößenverteilung und der spezifischen Oberfläche mesoporöser Feststoffe durch Stickstoffsorption Verfahren nach Barrett, Joyner und Halenda (BJH) [Determination of the pore size distribution and the specific surface mesoporous solids by nitrogen sorption Procedure according to Barrett, Joyner and Halenda (BJH)] (7 pages in German with machine translation).

Aerosolgeneratoren Und—Dispergierer. accessed May 7, 2018. http://www.tsi.com/Aerosolgeneratoren-und-dispergierer/ (3 pages in German with English translation).

Aerosolgernatoren fur Feststoffe. Accessed May 7, 2018. https://www.palas.de/de/product/aerosolgeneratorssolidparticles (2 pages in German with English translation).

International Preliminary Report on Patentabilty dated Sep. 12, 2023 for International Patent Application No. PCT/EP2022/057425 (7 pages).

Extended European search report mailed Sep. 20, 2021 for European Patent Application No. 21164198.0 (9 pages).

\* cited by examiner

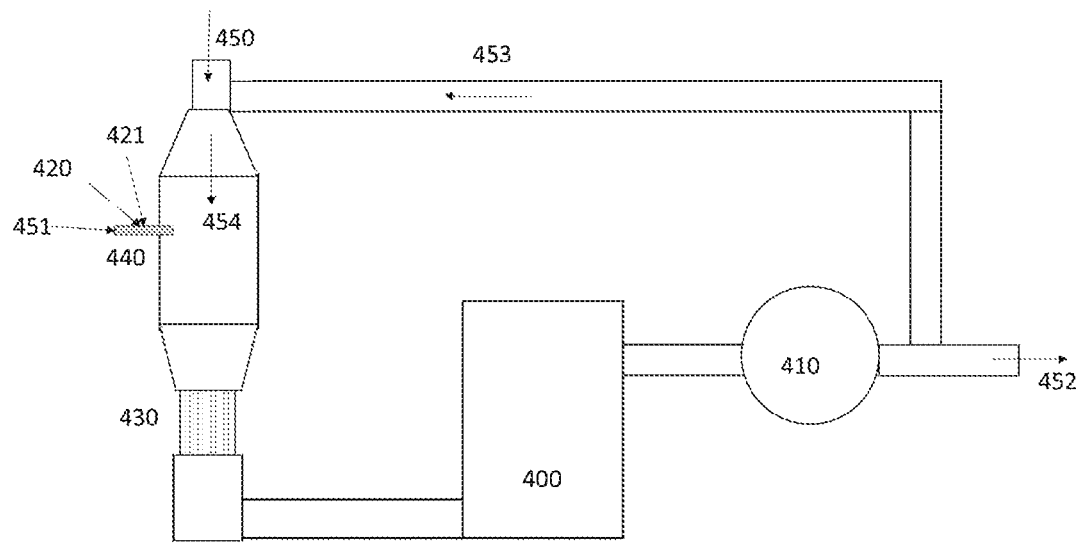

FILTER FOR THE AFTERTREATMENT OF EXHAUST GASES OF INTERNAL COMBUSTION ENGINES

FIELD OF THE INVENTION

The present invention pertains to a wall-flow filter, a method for its production and its use for the reduction of particles and harmful exhaust gases produced by internal combustion engines, in particular by lean burn gasoline engines.

BACKGROUND OF THE INVENTION

The exhaust gas of internal combustion engines in motor vehicles typically contains the harmful gases carbon monoxide (CO), hydrocarbons (HC), nitrogen oxides (NOx), and possibly sulfur oxides (SOx), as well as particulates that mostly consist of solid carbon-containing particles and possibly adherent organic agglomerates. These are called primary emissions. CO, HC, and particulates are the products of the incomplete combustion of the fuel inside the combustion chamber of the engine. Nitrogen oxides form in the cylinder from nitrogen and oxygen in the intake air when combustion temperatures exceed 1200° C. Sulfur oxides result from the combustion of organic sulfur compounds, small amounts of which are always present in non-synthetic fuels. Compliance with statutory exhaust emission limits for motor vehicles applicable in Europe, China, North America, and India requires the extensive removal of said substances, which are harmful to health and environment, from the exhaust gas.

The harmful gases carbon monoxide and hydrocarbons from a lean exhaust gas can easily be rendered harmless by oxidation on a suitable oxidation catalyst. In a stoichiometrically operated internal combustion engine, all three harmful gases (HC, CO, and NOx) can be eliminated via a three-way catalytic converter.

Gasoline particulate filters with and without additional catalytically active coating are suitable aggregates for removing the particulate emissions. In order to meet the legal standards, it is desirable for current and future applications to combine particulate filters with other catalytically active functionalities not only for reasons of cost but also for installation space reasons.

The use of a particulate filter, whether catalytically coated or not, leads to a noticeable increase in the exhaust-gas back pressure in comparison with a flow-through support of the same dimensions and thus to a reduction in the torque of the engine or possibly to increased fuel consumption. In order to not increase the exhaust-gas back pressure even further, the amounts of material (catalytically active material and support material) are generally applied in smaller quantities in the case of a filter than in the case of a flow-through support. As a result, the catalytic effectiveness of a catalytically coated particulate filter is frequently inferior to that of a flow-through monolith of the same dimensions.

There have already been some efforts to provide particulate filters which have good catalytic activity due to an active coating and yet have the lowest possible exhaust-gas back pressure. On the one hand, it has proven to be advantageous regarding back-pressure, if the catalytically active coating is not present as a layer on the wall of a porous wall-flow filter, but instead the wall of the filter is to be interspersed with the catalytically active material (see for example WO2005016497A1, JPH01-151706 and EP1789190B1). For this purpose, the particle size of the catalytic coating is selected such that the particles penetrate into the pores of the wall-flow filters and can be fixed there by calcination.

A further functionality of the filter, which can be improved by a coating, is its filtration efficiency, i.e., the filtering effect itself. WO 2011151711A1 describes a method by which a dry aerosol is applied to an uncoated or catalytically coated filter. The aerosol is provided by the distribution of a powdered high-melting metal oxide having a particle size of 0.2 to 5 µm and guided through the inlet side of a wall-flow filter by means of a gas stream. In this case, the individual particles agglomerate to form a bridged network of particles and are deposited as a layer on the surface of the individual inlet channels passing through the wall-flow filter. The typical powder loading of a filter is between 5 and 50 g per liter of filter volume. It is expressly pointed out that it is not desirable to end up with a coating inside the pores of the wall-flow filter with the metal oxide.

A further method for increasing the filtration efficiency of catalytically inactive filters is described in WO2012030534A1. In this case, a filtration layer ("discriminating layer") is created on the walls of the flow channels of the inlet side by the deposition of ceramic particles via a particle aerosol. The layers consist of oxides of zirconium, aluminum, or silicon, preferably in fiber form ranging from 1 nm to 5 µm, and have a layer thickness greater than 10 µm, typically 25 to 75 µm. After the coating process, the applied powder particles are calcined in a thermal process. WO2012030533A1 contains a similar disclosure.

A further method in which a membrane ("trapping layer") is produced on the surfaces of the inlet channels of filters in order to increase the filtration efficiency of catalytically inactive wall-flow filters is described in U.S. Pat. No. 8,277,880. The filtration membrane on the surfaces of the inlet channels is produced by sucking through a gas stream loaded with ceramic particles (for example, silicon carbide, cordierite). After application of the filter layer, the honeycomb body is fired at temperatures greater than 1000° C. in order to increase the adhesive strength of the powder layer on the channel walls. EP2502661A2 and EP2502662B1 mention further on-wall coatings by powder application. A coating inside the pores of a wall-flow filter unit by spraying dry particles is described in U.S. Pat. No. 8,388,721. In this case, however, the powder should penetrate deeply into the pores. 20% to 60% of the surface of the wall should remain accessible to soot particles, thus open. Depending on the flow rate of the powder/gas mixture, a more or less steep powder gradient between the inlet and outlet sides can be set.

The introduction of the powder into the pores, e.g. by means of an aerosol generator, is also described in EP2727640A1. Here, a non-catalytically coated wall-flow filter is coated using a gas stream containing, for example, aluminum oxide particles in such a way that the complete particles, which have a particle size of 0.1 to 5 µm, are deposited as a porous filling in the pores of the wall-flow filter. The particles themselves can realize a further functionality of the filter in addition to the filtering effect. For example, these particles are deposited in the pores of the filter in an amount greater than 80 g/l based on the filter volume. Here, they fill 10 to 50% of the volume of the filled pores in the channel walls. This filter, both loaded with soot and without soot, has an improved filtration efficiency compared to the untreated filter together with a low exhaust-gas back pressure of the soot-loaded filter.

WO2019211373A1 discloses a wall-flow filter for the reduction of harmful substances in the exhaust gas of an internal combustion engine, wherein a dry, non-catalytically coated filter is selectively impinged on its inlet surface with a dry powder-gas aerosol, which has at least a high-melting compound, in such a way that the powder is deposited in the pores of the filter walls and fills them up to the inlet surface but does not form a contiguous layer on the walls of the filter in the process.

Wall-flow filters which carry coating which is applied via dry powder-gas aerosol are also disclosed in WO2019197177A1, while WO2019215208A1 and WO2020094763A1 disclose methods to produce such wall-flow filters.

Besides good catalytic activity and filtration efficiency, a key aspect of aftertreatment devices like particulate filters, is their robustness during real life operation. This means that these devices need to be able to keep their catalytic and/or filtering functionalities over an extremely wide range of operating conditions, including for example extreme temperature variations from −40 up to 1000° C. and exposure to condensed water in the aftertreatment system. Particularly, the exposure to liquid water can impair the filtration efficiency of particulate filters.

There is therefore an urgent need to provide particulate filters whose filtration functionality is not impaired after exposure to liquid water.

BRIEF SUMMARY OF THE INVENTION

The present invention pertains to a wall-flow filter for removing particles from the exhaust gas of an internal combustion engine, which comprises a wall-flow filter substrate of length L and coating F,
- wherein the wall-flow filter substrate has channels E and A extending in parallel between a first and a second end of the wall-flow filter substrate, which are separated by porous walls and form surfaces $O_E$ and $O_A$, and
- wherein the channels E are closed at the second end and the channels A are closed at the first end, and
- wherein coating F is located on the surfaces $O_E$, optionally in the porous walls but not on the surfaces $O_A$,
- characterized in that coating F comprises a sintered material S, wherein material S comprises an oxide, oxide-hydroxide, carbonate, sulphate, silicate, phosphate, mixed oxide, composite oxide, molecular sieve or a mixture comprising two or more of these materials.

BRIEF DESCRIPTION OF DRAWING

FIG. 1 shows a schematic drawing of a device for applying material to a wall-flow filter substrate.

DETAILED DESCRIPTION

When the wall-flow filter according to the invention is used as intended for cleaning exhaust gas from an internal combustion engine, the exhaust gas flows into the filter at one end and leaves it again at the other end after passing through the porous walls. If, for example, the exhaust gas enters the filter at the first end, then the channels E designate the inlet channels or the upstream channels. After passing through the porous walls, it then leaves the filter at the second end, so that the channels A designate the outlet channels or channels on the downstream side.

Examples of material S are in particular oxides, oxide-hydroxides, carbonates, sulphates, silicates, in particular phyllosilicates, and phosphates of aluminum, sodium, calcium, silicon, titanium, zirconium, cerium, magnesium, barium and strontium and molecular sieves of the framework type ACO, AEI, AEN, AFN, AFT, AFX, ANA, APC, APD, ATT, BEA, BIK, CDO, CHA, DDR, DFT, EAB, EDI, EPI, ERI, ESV, ETL, GIS, GOO, IHW, ITE, ITW, LEV, KFI, MER, MON, NSI, OWE, PAU, PHI, RHO, RTH, SAT, SAV, SIV, THO, TSC, UEI, UFI, VNI, YUG, ZON.

Mixtures of two or more of the materials mentioned above can of course be used as well.

Products such as kaolin, gypsum, bentonite or montmorillonite, which are available on an industrial scale, can as well advantageously be used as material S.

Preferably, material S comprises ceria, calcium sulphate, aluminum phyllosilicate, aluminum silicate or a molecular sieve of the framework type CHA or FAU.

Coating F is not catalytically active which means it does not comprise a catalytically active metal, in particular no platinum group metal like platinum, palladium and rhodium.

In a preferred embodiment of the inventive wall-flow filter, coating F is applied onto the surfaces $O_E$ by depositing material S in powder form onto the channels E, followed by a thermal treatment to cause sintering of material S.

Material S in powder form preferably has a particle size distribution with a $d_{50}$ value of between 1 and 30 μm and a $D_{90}$ value of between 3 and 150 μm, wherein the $d_{50}$ and the $d_{90}$ value of the particle size distribution of material S means that 50% and 90%, respectively, of the total volume of the material contains only particles whose diameter is less than or equal to the value specified as $d_{50}$ and $d_{90}$ respectively.

In case material S is a molecular sieve, the SAR (silica-to-alumina mole ratio) is preferably 2 to 100.

Preferably, a molecular sieve used as material S has a sodium content of 0.01 to 15% by weight.

Material S is preferably applied onto the surfaces $O_E$ of the wall-flow filter substrate in that the channels E of the dry wall flow filter are exposed to a dry powder-gas-aerosol, wherein the powder is material S in powdery form. This process is known to a person skilled in the art as "dry-coating" and in principle he knows how to produce an aerosol from a powder and a gas in order to then guide the aerosol through the filter. The process ensures that the powder can be distributed sufficiently well for it to be able to penetrate into the inlet channels of the filter on the inlet side of the wall-flow filter substrate.

The aerosol of the gas and material S can be produced as required by the person skilled in the art or as shown below. For this purpose, material S is usually mixed with a gas, preferably as described in http://www.tsi.com/Aerosolgen-eratoren-und-dispergierer/ or https://www.palas.de/de/product/aerosolgeneratorssolidparticles. The mixture thus obtained is then advantageously fed into channels E of the wall flow filter via a gas stream.

The gas used for producing the aerosol and for introducing it into the wall-flow filter can be any gas that is suitable for the present purpose for the skilled person in the art. The use of air is very particularly preferred.

However, other reaction gases can also be used, which can either develop an oxidizing (e.g. $O_2$ or $NO_2$) or a reducing (e.g. $H_2$) activity towards material S. The use of an inert gas (e.g. $N_2$) or noble gas (e.g. He) can also prove to be advantageous. Mixtures of the gases mentioned above are also possible.

In order to establish the powder-gas-aerosol, material S can be dispersed in the gas in different ways. Preferably, the dispersion of material S is generated by at least one or a combination of the following measures: compressed air, ultrasound, sieving, "in-situ milling", blower, expansion of gases, fluidized bed. In principle, the skilled person in the art is free to choose a method for producing the powder-gas-aerosol and therefore other dispersion methods not mentioned here can also be used.

The powder-gas-aerosol produced in this way is only then introduced into a gas flow which carries the finely divided material S into the channels E of the wall-flow filter substrate. In order to be able to draw the powder sufficiently deeply into the pores on the surface of the filter wall on the inlet side of the filter, a certain suction power (if the powder is sucked through the filter) or a pressure power (if the powder is pressed through the filter) or optionally both are needed. Preferably, a suction power is used. The person skilled in the art can get an idea of this suction power for the wall-flow filter and material S used in orienting experiments. It has been found that the aerosol preferably is sucked at a speed of 5 to 60 m/s, more preferably 10 to 50 m/s and very particularly preferably 15 to 40 m/s through the wall flow filter.

Preferably, material S is mixed with ambient air and applied to the wall-flow filter substrate. By mixing the powder-gas-aerosol with particle-free, preferably dry ambient air, the concentration of the particles of material S is reduced to such a level that no significant agglomeration takes place before they are deposited in the wall flow filter substrate. This preserves the particle size set during dispersion in the aerosol.

FIG. 1 shows a schematic drawing of an advantageous device for applying material S to a wall-flow filter substrate. Material S (420) or (421) is mixed with the gas under pressure (451) through the atomizing nozzle (440) in the mixing chamber with the gas stream (454) and then sucked or pushed through the wall-flow filter substrate (430). The particles that have passed through are filtered out in the exhaust gas filter (400). The blower (410) provides the necessary volume flow. The exhaust gas is divided into an exhaust gas (452) and a warm cycle gas (453). The warm cycle gas (453) is mixed with fresh gas (450).

That means, a partial exhaust gas stream is removed downstream of the suction device and added again to the gas stream which is sucked through the wall flow filter substrate, before the addition of material S. As a result, the powder is metered into an air stream that has already been heated. The suction fan for the necessary pressures generate an exhaust air temperature of approx. 70°, since the installed suction power is preferably >20 kW. In terms of energy, the waste heat from the suction fan is used to heat the supply air in order to reduce its relative humidity. This in turn reduces the adhesion of the particles to one another and to the inlet plug. The deposition process of material S can thus be better controlled.

In order to deposit material S into channels E of the wall-flow filter substrate both should be dry. Dry within the meaning of the present invention means the exclusion of the use of a liquid, in particular of water. In particular, the preparation of a suspension of material S in a liquid for atomization in a gas stream should be avoided. For both material S and the wall-flow filter substrate, a certain amount of moisture can possibly be tolerated, provided that the achievement of the goal—the finely distributed deposition of material S onto the surfaces $O_E$—is not negatively influenced. As a rule, material S is free-flowing and dispersible due to the input of energy. The moisture of material S and the wall-flow filter substrate, respectively, at the time of exposure of material S should be less than 20%, preferably less than 10% and very particularly preferably less than 5% (measured at 20° C. and normal pressure according to ISO 11465, latest version on the filing date).

According to the process described above material S is deposited onto the surfaces $O_E$. Depending on material S and on the exact process conditions, a part of material S can also be deposited into the porous walls. This, however, has no negative impact on the usability of the wall-flow filter as claimed.

After material S has been deposited on the surfaces $O_E$, preferably via the dry-coating process described above, it must be sintered by means of a heat treatment.

The heat treatment comprises heating the wall-flow filter substrate which carries material S on its surfaces $O_E$ and optionally within the porous surfaces to a temperature T and maintaining this temperature for a period of time M.

The temperature and the time required for sintering depend almost entirely on material S itself and can be determined by a person skilled in the art via easy experiments. In general, the wall-flow filter substrate is heated with a heating rate of e.g. 100 to 1000 K/h to a temperature T of 100 to 1350° C. and maintained at that temperature for a period of time M of 1 second to twelve hours.

For example, if material S is a zeolite of the structure type CHA with a SAR of 2 to 100 and a sodium content of 0.01 to 15% by weight M is 9 to 11 hours and T is 1000 to 1200° C.

The heat treatment results in the interparticle sintering of material S, generating a three-dimensional structure on the surfaces $O_E$, that is not affected by contact with liquid water.

The sintering of material S can be tracked and recognized by means of the change of the back pressure of the wall-flow filter after applying the thermal treatment. According to this method a wall-flow filter carrying material S is put into a furnace and the temperature is raised on a certain temperature T for a certain time M. After that treatment the back pressure of the wall-flow filter is measured and compared to the value before the thermal treatment. The sintering of material S is indicated by a clear decrease of the back pressure. For further information see Examples and Table 1.

All ceramic materials customary in the prior art can be used as material for the wall-flow filter substrate. Porous wall-flow filter substrates made of cordierite, silicon carbide or aluminum titanate are preferably used. Exhaust gas, which for example flows at the first end of the filter into channels E must pass the porous wall and enter channels A to leave the filter at the second end. Flowing through the filter as mentioned delivers an excellent particulate filtering effect.

The filtration property for particulates can be designed by means of porosity, pore/radii distribution, and thickness of the wall. The porosity of the uncoated wall-flow filters is typically more than 40%, generally from 40 to 75%, particularly from 50 to 70% (measured according to DIN 66133, latest version on the date of application). The average pore size of the uncoated filters is at least 7 µm, for example from 7 to 34 µm, preferably more than 10 µm, in particular more preferably from 10 to 25 µm, or very preferably from 15 to 20 µm (measured according to DIN 66134, latest version on the date of application). Wall-flow filters with a pore size of 10 to 20 µm and a porosity of 50 to 65% are particularly preferred.

In a preferred embodiment of the present invention the wall-flow filter does in addition to coating F comprise coating Z, which is coated on the surfaces $O_E$, the surfaces $O_A$ and/or within the porous walls and comprises palladium and/or rhodium and a cerium/zirconium mixed oxide.

Preferably, coating Z is mainly located on the surfaces $O_A$ and partially within the porous walls. In this case, the preferred ratio of coating Z being located in the porous walls to coating Z being located on the surfaces $O_A$ is from 0 to 1, even more preferred from 0 to 0.5 and most preferred from 0 to 0.25.

In particular due to the components palladium and/or rhodium, coating Z is a catalytically active coating. In the context of the present invention, "catalytically active" is understood to mean the ability to convert harmful constituents of the exhaust gas from internal combustion engines, in particular NOx, CO and HC, into less harmful ones. Consequently, coating Z is particularly preferably three-way catalytically active, in particular at operation temperatures of 250 to 1100° C.

Coating Z comprises the noble metals palladium and/or rhodium, with platinum only being present as an additional noble metal in exceptional cases. Coating Z particularly preferably comprises palladium and rhodium and no platinum.

In another embodiment, coating Z comprises platinum and rhodium and no palladium.

In still another embodiment, coating Z comprises platinum and palladium and optionally rhodium. In this embodiment it is advantageous if the mass ratio of platinum to palladium is 15:1 to 1:15, in particular 10:1 to 1:10.

In relation to the inventive wall-flow filter, the proportion of rhodium in the total noble metal content is in particular greater than or equal to 5% by weight, preferably greater than or equal to 10% by weight. For example, the proportion of rhodium in the total noble metal content is 5 to 20% by weight or 5 to 15% by weight, The noble metals are usually used in amounts of 0.10 to 5 g/l, based on the volume of the wall-flow filter substrate.

The noble metals are usually fixed on one or more carrier materials. All materials familiar to the person of skill in the art for this purpose can be considered as support materials. Such materials are in particular metal oxides with a BET surface area of 30 to 250 m²/g, preferably 100 to 200 m²/g (determined according to DIN 66132, latest version on the filing date). Particularly suitable support materials for the noble metals are selected from the group consisting of alumina, doped alumina, silica, titania and mixed oxides and composite oxides of one or more of the oxides mentioned. Doped alumina is, for example, lanthana-, zirconia-, baria- and/or titania-doped alumina.

Alumina or lanthanum-stabilized alumina is advantageously used, with lanthanum in amounts of in particular 1 to 10% by weight, in each case calculated as $La_2O_3$ and based on the weight of the stabilized alumina. In the case of alumina doped with baria, too, the proportion of baria is in particular 1 to 10% by weight, preferably 3 to 6% by weight, in each case calculated as BaO and based on the weight of the stabilized alumina. Another suitable carrier material is lanthanum-stabilized alumina, the surface of which is coated with lanthana, baria and/or strontia.

Coating Z preferably comprises at least one alumina or doped alumina.

Coating Z comprises at least one cerium/zirconium mixed oxide that functions as an oxygen storage component. The mass ratio of cerium oxide to zirconium oxide can vary within wide limits in these products. It is, for example, 0.1 to 1.5, preferably 0.15 to 1.5 or 0.2 to 0.9.

Preferred cerium/zirconium mixed oxides comprise one or more rare earth metal oxides and can thus be referred to as cerium/zirconium/rare earth metal mixed oxides. The term "cerium/zirconium/rare earth metal mixed oxides" in the context of the present invention excludes physical mixtures of ceria, zirconia and a rare earth oxide. Rather, "cerium/zirconium/rare earth metal mixed oxides" are characterized by a largely homogeneous, three-dimensional crystal structure that is ideally free of phases of pure ceria, zirconia or rare-earth oxide (solid solution). Depending on the manufacturing process, however, products that are not completely homogeneous can also arise, which can generally be used without disadvantage. The same applies to cerium/zirconium mixed oxides that do not comprise any rare earth metal oxide. Furthermore, the terms "rare earth metal" and "rare earth metal oxide" in the context of the present invention do not include cerium or ceria.

Examples of rare-earth metal oxides in the cerium/zirconium/rare earth metal mixed oxides are lanthana, yttria, praseodymia, neodymia and/or samaria. Lanthana, yttria and/or praseodymia are preferred. Lanthana and/or yttria are particularly preferred and lanthana and yttria, yttria and praseodymia and lanthana and praseodymia are very particularly preferred. In embodiments of the present invention, the oxygen storage components are free of neodymia. The proportion of rare earth metal oxide in the cerium/zirconium/rare earth metal mixed oxides is in particular 3 to 20% by weight, based on the cerium/zirconium/rare earth metal mixed oxide.

If the cerium/zirconium/rare earth metal mixed oxides contain yttria as rare earth metal, its proportion is preferably 4 to 15% by weight based on the cerium/zirconium/rare earth metal mixed oxide. If the cerium/zirconium/rare earth metal mixed oxides contain praseodymia as rare earth metal, its proportion is preferably 2 to 10% by weight based on the cerium/zirconium/rare earth metal mixed oxide. If the cerium/zirconium/rare earth metal mixed oxides contain lanthana and an additional rare earth metal oxide, like e.g. yttria or praseodymia, their mass ratio is in particular 0.1 to 1.25, preferably 0.1 to 1.

Coating Z usually comprises oxygen storage components in amounts of 15 to 129 g/l based on the volume of the wall-flow filter substrate. The mass ratio of carrier materials and oxygen storage components in coating Z is usually 0.25 to 1.5, for example 0.3 to 1.3.

For example, the weight ratio of the sum of the masses of all aluminas (including doped aluminas) to the sum of the masses of all cerium/zirconium mixed oxides in coating Z is 10:90 to 75:25.

In an embodiment of the present invention, coating Z comprises lanthanum-stabilized alumina, rhodium, palladium or palladium and rhodium and a cerium/zirconium/rare earth metal mixed oxide which contains yttria and lanthana as rare earth metal oxides.

In another embodiment of the present invention, coating Z comprises lanthanum-stabilized alumina, rhodium, palladium or palladium and rhodium and a cerium/zirconium/rare earth metal mixed oxide which contains praseodymia and lanthana as rare earth metal oxides.

In still another embodiment of the present invention, coating Z comprises lanthanum-stabilized alumina, rhodium, palladium or palladium and rhodium and a cerium/zirconium/rare earth metal mixed oxide which contains praseodymia and lanthana as rare earth metal oxides and a second cerium/zirconium/rare earth metal mixed oxide which contains yttria and lanthana as rare earth metal oxides.

Preferably, coating Z does neither comprise a zeolite nor a molecular sieve.

If coating Z is on the surfaces $O_A$ of the wall-flow filter substrate, it preferably extends from the second end of the wall flow filter substrate to 40 to 97% of the length L, more preferred from 50 to 90%.

The coating on the surfaces $O_A$ is what is known as on-wall coating. This is to be understood as meaning that the coating rises above the surfaces $O_A$ into the channels A of the wall-flow filter substrate, thus lowering the channel cross section. In this embodiment, the pores of the porous walls adjoining the surfaces $O_A$ are filled with coating Z only to a minor extent. More than 80%, preferably more than 90% of coating Z is not located in the porous wall.

As mentioned above, on-wall coatings have a certain elevation above the wall surface. However, the thickness of the layer Z is generally from 5 to 250 µm, preferably from 7.5 to 225 µm and very preferably from 10 to 200 µm, the thickness of the layer preferably being determined in a middle of a respective channel and not in the corners. Common analytical methods known to those skilled in the art, such as scanning electron microscopy, are suitable for determining the layer thickness.

The same applies if coating Z is not on the surfaces $O_A$ but on the surfaces $O_E$ or on both, surfaces $O_A$ and $O_E$. In case coating Z is on surface $O_E$ it is usually coated on coating F.

If coating Z is within the porous walls of the wall-flow filter substrate, it preferably extends from the first end of the wall flow filter substrate to 50 to 100% of the length L.

The coating in the porous walls is what is known as in-wall coating. In this embodiment, the surfaces $O_E$ and $O_A$ adjoining the porous walls are coated with coating Z only to a minor extent.

In a further preferred embodiment of the present invention the wall-flow filter does in addition to coating F and optionally in addition to coating Z, comprise coating Y, which is different from coatings F and Z, is coated on the surfaces $O_E$ and/or within the porous walls but not in the surfaces $O_A$ and which comprises platinum, palladium or platinum and palladium and no rhodium and no cerium/zirconium mixed oxide.

Coating Y preferably comprises platinum and palladium with a mass ration of platinum to palladium of 25:1 to 1:25, particularly preferably 15:1 to 1:2.

In coating Y platinum and palladium are usually fixed on one or more carrier materials. All materials familiar to the person of skill in the art for this purpose can be considered as support materials. Such materials are in particular metal oxides with a BET surface area of 30 to 250 m²/g, preferably 100 to 200 m²/g (determined according to DIN 66132, latest version on the filing date). Particularly suitable support materials for the noble metals are selected from the group consisting of alumina, doped alumina, silica, titania and mixed oxides and composite oxides of one or more of the oxides mentioned. Doped alumina is, for example, lanthana-, zirconia-, baria- and/or titania-doped alumina.

Alumina or lanthanum-stabilized alumina is advantageously used, with lanthanum in amounts of in particular 1 to 10, preferably 3 to 6% by weight, in each case calculated as $La_2O_3$ and based on the weight of the stabilized alumina.

In the case of alumina doped with baria, too, the proportion of baria is in particular 1 to 10% by weight, preferably 3 to 6% by weight, in each case calculated as BaO and based on the weight of the stabilized alumina. Another suitable carrier material is lanthanum-stabilized alumina, the surface of which is coated with lanthana, baria and/or strontia.

Coating Y preferably comprises at least one alumina or doped alumina.

In one embodiment coating Y is located exclusively on the surfaces $O_E$, specifically on top of coating F, of the wall-flow filter substrate and, starting from its first end, extends over a length of 50 to 90% of the length L.

In another embodiment, the coating Y is located in the porous walls of the wall-flow filter substrate and extends, starting from its first end, preferably over a length of 50 to 100% of the length L.

In a still further preferred embodiment of the present invention the wall-flow filter does in addition to coating F and optionally in addition to coating Y, comprise coating X, which is different from coatings F and Y and is coated on the surfaces $O_E$, $O_A$ and/or within the porous walls and which comprises a SCR catalyst.

In principle, the SCR catalyst of coating X may be selected from all catalysts active in the SCR reaction of nitrogen oxides with ammonia, particularly such as are commonly known to the person skilled in the art in the field of automotive exhaust gas catalysis. This includes catalysts of the mixed-oxide type, as well as catalysts based upon zeolites, in particular transition metal-exchanged zeolites.

Mixed oxides which can be used as SCR catalyst in coating X are in particular based on titanium dioxide and/or oxides of vanadium such as vanadium pentoxide, and which usually contain other oxides, such as those of silicon, molybdenum, manganese, tungsten, cerium, antimony and zirconium. Suitable oxides of the latter metals are in particular $WO_3$, $SiO_2$, $MoO_3$, $CeO_2$, $Sb_2O_5$ and $ZrO_2$. Such catalysts are described in detail in the literature, for example in WO89/03366A1, EP345 695A2, EP385164A2, WO2011/011101A1, WO2011/013006A2, WO2011/127505A1, US2013/205743, WO2017/101449A1, WO2018/018406A1 and WO2019/096785A1.

Preferably, SCR catalysts are used that contain a small-pore zeolite with a maximum ring size of eight tetrahedral atoms and a transition metal. Such SCR catalysts are described in, for example, WO2008/106519 A1, WO2008/118434 A1, and WO2008/132452 A2.

In addition, however, large-pore and medium-pore zeolites may also be used, wherein those of the BEA and FAU structural types, in particular, come into question. For example, iron-BEA and copper-BEA are of interest.

Particularly preferred zeolites belong to the BEA, FAU, AEI, AFX, CHA, KFI, ERI, LEV, MER, or DDR structure types and are particularly preferably exchanged with cobalt, iron, copper, or mixtures of two or three of these metals.

The term, zeolites, here also includes molecular sieves, which are sometimes also referred to as "zeolite-like" compounds. Molecular sieves are preferred, if they belong to one of the aforementioned structure types. Examples include silica aluminum phosphate zeolites, which are known by the term, SAPO, and aluminum phosphate zeolites, which are known by the term, AlPO. These too are particularly preferred, when they are exchanged with cobalt, iron, copper, or mixtures of two or three of these metals.

Preferred zeolites are also those that have an SAR (silica-to-alumina mole ratio) value of 2 to 100—in particular, 5 to 50.

The zeolites or molecular sieves contain transition metal in particular in quantities of 1 to 10 weight %, and especially 2 to 5 weight %, calculated as metal oxide, i.e., for example, as $Fe_2O_3$ or CuO.

Especially preferably, coating X comprises zeolites of the structural types BEA, CHA, LEV or AEI zeolites or molecular sieves exchanged with copper, iron, or copper and iron as SCR catalysts. Appropriate zeolites or molecular sieves are known, for example, by the names, ZSM-5, Beta, SSZ-13, SSZ-62, Nu-3, ZK-20, LZ-132, SAPO-34, SAPO-35, AlPO-34, and AlPO-35; see, for example, U.S. Pat. Nos. 6,709,644 and 8,617,474.

The wall-flow filter of the present inventions usually carries either coating F alone, or coatings F and Z, or coatings F and Y or coatings F and X or coatings F, Z and Y or coatings F, Y and Z.

The coatings Z, Y and X can be applied to the wall-flow filter substrate by means of a coating method known per se to the person skilled in the art. This coating process comprises the application of a slightly viscous aqueous suspension, also called washcoat, of the components of the coating to be applied (Z, Y or X) onto surfaces $O_E$, $O_A$ and/or into the porous walls, for example according to the teaching of EP1789190B1.

After the suspension has been applied, the wall-flow filter is dried and, if necessary, calcined at an elevated temperature.

If desired the process can be repeated to apply one of the other coatings. Usually, the wall-flow filter substrate can carry up to three coatings. While it is in theory also possible to apply all four coatings F, Z, Y and X, wall-flow filters carrying coatings Z and X have usually only less technical value.

Coating Z is usually coated onto the wall-flow filter substrate in an amount of 20 to 200 g/l, preferably 30 to 150 g/l.

Coating Y is usually coated onto the wall-flow filter substrate in an amount of 5 to 100 g/l.

Coating X is usually coated onto the wall-flow filter substrate in an amount of 20 and 140 g/l.

The wall-flow filter of the present invention exhibits an excellent filtration efficiency with only a moderate increase in exhaust-gas back pressure as compared to a wall-flow filter in the fresh state that does not have coating F. The wall-flow filter according to the invention preferably exhibits an increase in filtration efficiency of at least 5% absolute, preferably at least 20% absolute, and very particularly preferably at least 40% absolute at a relative increase in the exhaust-gas back pressure of the fresh wall-flow filter of at most 40%, preferably at most 20%, and very particularly preferably at most 10%, as compared to a fresh filter not having coating F. Particularly advantageous is an improvement in filtration efficiency of at least 20% with a maximum back pressure increase of no more than 40%.

However, it is a particularly valuable advantage of the wall-flow filter according to the invention that coating F is not impaired by liquid water. The filtration properties remain unchanged after exposure to liquid water.

The present invention therefore also relates to the use of a wall-flow filter according to the invention for reducing harmful exhaust gases of an internal combustion engine, wherein the gas enters the wall-flow filter through channels E and leaves it through channels A. The use of the wall-flow filter according to the invention for treating exhaust gases from a stoichiometrically operated internal combustion engine, that is to say in particular an internal combustion engine operated with gasoline, is preferred. In that case the wall-flow filter substrate besides coating F carries advantageously coating Z and/or coating Y. Further, the wall-flow filter according to the invention is very advantageously used in that case in combination with at least one three-way catalyst. In particular, it is advantageous if a closed-coupled three-way catalyst is on the upstream side of the wall-flow filter according to the invention. Likewise, its is advantageous if a three-way catalyst is located downstream of the wall-flow filter according to the invention. It is also advantageous if there is a three-way catalyst on the inflow side and on the outflow side of the wall-flow filter.

The preferred embodiments described for the wall-flow filter according to the invention also apply mutatis mutandis to the use mentioned here.

Besides, the use of the wall-flow filter according to the invention for treating exhaust gases from lean-burn combustion engines, such as diesel engines or lean-burn operated gasoline engines, is likewise preferred. In that case the wall-flow filter substrate besides coating F carries advantageously coating Y and/or coating X. Further, the wall-flow filter according to the invention is very advantageously used in that case in combination with at least one SCR-catalyst and/or at least one diesel oxidation catalyst. In particular, it is advantageous if a SCR-catalyst and/or a diesel oxidation catalyst is on the upstream side of the wall-flow filter according to the invention. Likewise, its is advantageous if a SCR-catalyst and/or a diesel oxidation catalyst is located downstream of the wall-flow filter according to the invention. It is also advantageous if there is a SCR-catalyst and/or a diesel oxidation catalyst on the inflow side and a SCR-catalyst and/or a diesel oxidation catalyst on the outflow side of the wall-flow filter.

The preferred embodiments described for the wall-flow filter according to the invention also apply mutatis mutandis to the use mentioned here.

The present invention also relates to an exhaust gas cleaning system which comprises a wall-flow filter according to the invention and at least one further catalyst. In one embodiment of this system, at least one further catalyst is arranged upstream of the wall-flow filter according to the present invention. This is preferably a three-way catalyst or an oxidation catalyst or a NOx-storage catalyst.

In another embodiment of this system, at least one further catalyst is arranged downstream of the wall-flow filter according to the present invention. This is preferably a three-way catalyst or a SCR-catalyst or a NOx-storage catalyst or an ammonia slip catalyst.

In still another embodiment of this system, at least one further catalyst is arranged upstream of the wall-flow filter according to the present invention and at least one further catalyst is arranged downstream of the wall-flow filter according to the present invention. Preferably the catalyst arranged upstream is a three-way catalyst or an oxidation catalyst or a NOx-storage catalyst and the catalyst arranged downstream is a three-way catalyst or a SCR catalyst or a NOx-storage catalyst or an ammonia slip catalyst.

The preferred embodiments described for the wall-flow filter according to the invention also apply mutatis mutandis to the exhaust gas cleaning system mentioned here.

The filter according to the invention is usually used primarily in internal combustion engines, in particular in internal combustion engines with direct injection or manifold injection. These can be stoichiometrically operated gasoline or natural gas engines or lean-burn diesel or gasoline engines. They are preferably turbocharged engines.

FIG. 1 shows a schematic drawing of an advantageous device for applying powder to the wall-flow filter. The powder (420) or (421) is mixed with the gas under pressure (451) through the atomizing nozzle (440) in the mixing chamber with the gas stream (454) and then sucked or pushed through the filter (430). The particles that have passed through are filtered out in the exhaust gas filter (400). Blower (410) provides the necessary volume flow. The exhaust gas is divided into an exhaust gas (452) and a warm cycle gas (453). The warm cycle gas (453) is mixed with the fresh gas (450).

EXAMPLE 1 a) A wall-flow filter substrate of cordierite with a diameter of 4.66", a length of 6", a cell density of 300 CPSI and a wall thickness of 8.5 mils was coated on its inlet channels with 28 g/l of a zeolite of the structure type CHA with a SAR of 13, and a particle size distribution with $d_{50}$=2.6 µm and $d_{90}$=5.4 µm.

The coating process used was a dry coating process using air as gas for producing the powder-gas-aerosol and for introducing it into the inlet channels of the wall-flow filter substrate.

b) The wall-flow filter obtained according to a) above was heated with a heating rate of 150 K/h to 1100° C. and kept at this temperature for 10 h. This treatment caused the zeolite to sinter.

c) The wall-flow filter obtained according to b) above was coated on the surfaces of its outlet channels over 80% of its length starting from the outlet end with 61 g/l of a washcoat comprising 45 g/ft$^3$ of palladium and rhodium in a weight ratio of 7:2. The process used was a conventional wet coating process. Subsequently, the filter was dried.

EXAMPLE 2 a) A wall-flow filter substrate of cordierite with a diameter of 4.66", a length of 6", a cell density of 300 CPSI and a wall thickness of 8.5 mils was coated on its inlet channels with 28 g/l of a zeolite of the structure type FAU with a SAR of 5, and a particle size distribution with $d_{50}$=2.2 µm and $d_{90}$=5.9 µm.

The coating process used was a dry coating process using air as gas for producing the powder-gas-aerosol and for introducing it into the inlet channels of the wall-flow filter substrate.

b) The wall-flow filter obtained according to a) above was heated with a heating rate of 150 K/h to 900° C. and kept at this temperature for 1 h. This treatment caused the zeolite to sinter.

The product obtained is subsequently called F2.

Comparison Example 1

Example 2 was repeated with the exception that in step b) the filter was heated up to 700° C. This temperature did not cause the zeolite to collapse.

The product obtained is subsequently called CF1.

Comparison of F2 and CF1 a) The back pressures of wall-flow filters F2 and CF1 were determined (in mbar at 600 Nm$^3$/h) and subsequently, they were subjected to a water soaking test as follows:
1. Measure back pressure
2. Fill a glass beaker with an amount of water corresponding to the water uptake of the used ceramic substrate (e.g. 300 ml).
3. Place the part in the beaker and let water being soaked until the wall-flow substrate is completely wet
4. Dry the part at 120° C., followed by 350° C. in the direction of gas flow
5. Cool to Room temperature and measure back pressure b) After the water soaking, the back pressures of F2 and CF1 were determined again. The results are shown in FIGS. 2 and 3. The back pressure of wall-flow filter F2 was unchanged compared to before the soaking with water, indicating that the zeolite was sintered and formed a coating which is stable against liquid water. In contrast to that, CF1 suffered a tremendous loss of the back pressure indicating that the zeolite was not sintered and was not stable against liquid water.

Example 3

Example 2 was repeated with the difference that instead of a zeolite commercially available kaolin, a naturally occurring product based on alumina silicate, was used. The kaolin had a $d_{50}$ of 5 µm and a $d_{90}$ of 17 µm. It turned out that the treatment of the wall-flow filter obtained by dry coating with this product for 10 h at 1100° C. resulted in a back-pressure decrease, indicating that sintering occurred. In addition, back pressure did not change after the water soaking test described above. The results are also confirmed by a stable filtration efficiency.

Example 4

Example 2 was repeated with the difference that instead of a zeolite a commercially available product based on calcium sulphate (trade name Uniflott) was used. The product had a $d_{50}$ of 3 µm and a $d_{90}$ of 6.5 µm. It turned out that the treatment of the wall-flow filter obtained by dry coating with this product for 1 h at 900° C. resulted in a back pressure decrease, indicating that sintering occurred. In addition, back pressure did not change after the water soaking test described above. The results are also confirmed by a stable filtration efficiency.

Example 5

Example 2 was repeated with the difference that instead of a zeolite commercially available Bentonite was used. The product had a $d_{50}$ of 3 µm and a $d_{90}$ of 6.0 µm.

It turned out that the treatment of the wall-flow filter obtained by dry coating with this product for 1 h at 900° C. resulted in a back pressure decrease, indicating that sintering occurred. In addition, back pressure did not change after the water soaking test described above. The results are also confirmed by a stable filtration efficiency.

The data for Examples 1 to 5 and comparison Example 1 are given in Table 1

TABLE 1

| Example | Material | T [° C.] | M [hours] | BP0 | BP1 | BP2 | BP3 |
|---|---|---|---|---|---|---|---|
| 1 (Filter F1) | Zeolite (CHA; SAR = 13) | 1100 | 10 | 53.9 | 71.2 | 57.4 | 57.4 |
| 2 (Filter F2) | Zeolite (FAU; SAR = 5) | 900 | 1 | 54.9 | 80.3 | 68.3 | 68.2 |
| Comparison Example 1 (Filter CF1) | Zeolite (FAU; SAR = 5) | 700 | 1 | 55.2 | 81.4 | 81.3 | 57.8 |
| 3 | Kaolin | 1100 | 10 | 55.0 | 64.1 | 58.3 | 58.3 |
| 4 | Uniflott | 900 | 1 | 54.3 | 61.2 | 59.0 | 59.0 |
| 5 | Bentonite | 900 | 1 | 54.6 | 68.4 | 59.6 | 59.6 |

In Table 1 BP0 represents the back pressure measured at a flow of 600 Nm$^3$/h over the uncoated substrate, BP1 represents the back pressure measured at a flow of 600 Nm$^3$/h over the sample after being coated with the powder material, BP2 represents the back pressure measured at a flow of 600 Nm$^3$/h over the sample after being subject to a thermal treatment at temperature T for a duration M (as given in Table 1) and BP3 represents the back pressure measured at a flow of 600 Nm$^3$/h over the sample after being subject to the water soaking test as described in the following.

A difference between BP1 and BP2 (with BP2<BP1) indicates the sintering of material S.

A difference between BP2 and BP3 (with BP3<BP2) indicates the absence of stability against liquid water.

The invention claimed is:

1. Wall-flow filter for removing particles from the exhaust gas of an internal combustion engine, which comprises a wall-flow filter substrate of length L and coating F, wherein the wall-flow filter substrate has channels E and A extending in parallel between a first and a second end of the wall-flow filter substrate, which are separated by porous walls and form surfaces $O_E$ and $O_A$, and wherein the channels E are closed at the second end and the channels A are closed at the first end, and wherein coating F is located on the surfaces $O_E$, optionally in the porous walls but not on the surfaces $O_A$,
characterized in that coating F comprises a sintered material S, wherein material S comprises kaolin, gypsum, bentonite, montmorillonite or a mixture comprising two or more of these materials, wherein
coating F is applied onto the surfaces $O_E$ by depositing material S in powder form onto the channels E, followed by a thermal treatment to cause sintering of material S, and the thermal treatment comprises heating the wall-flow filter substrate which carries material S on its surfaces $O_E$ to a temperature T and maintaining this temperature for a period of time M, and the wall-flow filter substrate is heated with a heating rate of 100 to 1000 K/h to a temperature T of 100 to 1350° C. and maintained at that temperature for a period of time M of 1 second to twelve hours;
and said wall-flow filter further comprising coating Z, which is coated on the surfaces $O_A$ and comprises palladium and/or rhodium and at least one cerium/zirconium mixed oxide, with the at least one cerium/zirconium mixed oxide comprising yttria and lanthana or praseodymia and lanthana; and wherein coating Z extends from the second end of the wall flow filter substrate to 40 to 97% of the length L of the wall-flow filter.

2. Wall-flow filter according to claim 1, characterized in that material S is applied onto the surfaces $O_E$ of the wall-flow filter substrate in that the channels E of the wall-flow filter substrate are exposed to a dry powder-gas-aerosol, wherein the powder is material S in powdery form.

3. Wall-flow filter according to claim 1 wherein coating Z is additionally coated on the surfaces $O_E$ and/or within the porous walls.

4. Wall-flow filter according to claim 1, characterized in that it comprises, in addition to coating F and coating Z, coating Y, which is different from coatings F and Z and is coated on the surfaces $O_E$ and/or within the porous walls but not on the surfaces $O_A$ and which comprises platinum, palladium or platinum and palladium and no rhodium and no cerium/zirconium mixed oxide.

5. Wall-flow filter according to claim 1, characterized in that it contains, in addition to coatings F and coating Z, coating X, which is different from coatings F and Z, is coated on the surfaces $O_E$, $O_A$ and/or within the porous walls and comprises a SCR catalyst.

6. Wall-flow filter according to claim 1, wherein the at least one cerium/zirconium mixed oxide in coating Z comprises yttria and lanthana.

7. Wall-flow filter according to claim 1, wherein the at least one cerium/zirconium mixed oxide in coating Z comprises praseodymia and lanthana.

8. Wall-flow filter according to claim 1, wherein coating Z comprises a first cerium/zirconium mixed oxide of yttria and lanthana and a second cerium/zirconium mixed oxide comprising praseodymia and lanthana.

9. Wall-flow filter according to claim 1, wherein coating Z extends from the second end of the wall flow filter substrate to 50 to 90% of the length L of the wall-flow filter.

10. Wall-flow filter according to claim 1, wherein coating Z extends from the second end of the wall flow filter substrate to 50 to 80% of the length L of the wall-flow filter.

11. Wall-flow filter according to claim 1, wherein material S comprises at least one of kaolin, gypsum, and bentonite.

12. Wall-flow filter according to claim 1, characterized in that material S in powder form has a particle size distribution with a $d_{50}$ value of between 1 and 30 µm and a $d_{90}$ value of between 3 and 150 µm, wherein the $d_{50}$ and the $d_{90}$ value of the particle size distribution of material S means that 50% and 90%, respectively, of the total volume of the material contains only particles whose diameter is less than or equal to the value specified as $d_{50}$ and $d_{90}$ respectively.

13. Wall-flow filter according to claim 12, wherein the $d_{50}$ value is between 1 and 5 micron.

14. Wall-flow filter according to claim 1, characterized in that it comprises, in addition to coatings F and coating Z, one or both of coating Y and coating X, with each of coatings Y and X being different from coatings F and Z; and coating Y, when present, is coated on the surfaces $O_E$ and/or within the porous walls but not in the surfaces $O_A$, and with coating Y comprising platinum, palladium or platinum and palladium and no rhodium and no cerium/zirconium mixed oxide; and coating X, when present, is different from coatings F, Z and Y, and is coated on the surfaces $O_E$, $O_A$ and/or within the porous walls and comprises an SCR catalyst.

15. Wall-flow filter according to claim 14, characterized in that it carries coatings F, Z and Y.

16. A method for reducing harmful exhaust gases of an internal combustion engine, comprising passing the harmful exhaust gases through the channels E of the wall-flow filter according to claim 1 and out through the channels A of the wall-flow filter.

17. Exhaust gas cleaning system comprising a wall-flow filter according to claim 1 and at least one further catalyst, and wherein coating F does not comprise a catalytically active material, and wherein the further catalyst is a three-way catalyst or an oxidation catalyst or an NOx-storage catalyst or an SCR catalyst.

18. Exhaust gas cleaning system according to claim 17, characterized in that the further catalyst is an SCR catalyst, and coating Z comprises a cerium/zirconium mixed oxide.

19. A wall-flow filter for removing particles from the exhaust gas of an internal combustion engine, comprising:
a wall-flow filter substrate of length L;
coating F; and
coating Z,
wherein the wall-flow filter substrate has channels E and A extending in parallel between a first and a second end of the wall-flow filter substrate, which are separated by porous walls and form surfaces $O_E$ and $O_A$, and wherein the channels E are closed at the second end and the channels A are closed at the first end, and wherein coating F is located on the surfaces $O_E$, optionally in the porous walls but not on the surfaces $O_A$,
wherein coating F comprises a sintered material S, wherein material S comprises kaolin, gypsum, bentonite, montmorillonite or a mixture comprising two or more of these materials, and
wherein coating Z comprises one of (i), (ii) or (iii); with (i) being lanthanum-stabilized alumina, rhodium, palladium, or palladium and rhodium and a cerium/zirconium/rare earth metal mixed oxide which contains yttria and lanthana as rare earth metal oxides;

(ii) being lanthanum-stabilized alumina, rhodium, palladium, or palladium and rhodium and a cerium/zirconium/rare earth metal mixed oxide which contains praseodymia and lanthana as rare earth metal oxides; and (iii) being lanthanum-stabilized alumina, rhodium, palladium, or palladium and rhodium and a first cerium/zirconium/rare earth metal mixed oxide which contains praseodymia and lanthana as rare earth metal oxides and a second cerium/zirconium/rare earth metal mixed oxide which contains yttria and lanthana as rare earth metal oxide, and wherein coating Z extends from the second end of the wall flow filter substrate to 40 to 97% of the length L of the wall-flow filter.

20. Wall-flow filter according to claim 19, wherein coating Z extends from the second end of the wall flow filter substrate to 50 to 80% of the length L of the wall-flow filter.

21. Wall-flow filter according to claim 19, wherein material S comprises at least one of kaolin, gypsum, and bentonite.

* * * * *